(12) United States Patent
Steiner

(10) Patent No.: US 11,666,175 B2
(45) Date of Patent: Jun. 6, 2023

(54) DEVICE FOR HEATING MILK OR MILK FOAM

(71) Applicant: STEINER AG WEGGIS, Weggis (CH)

(72) Inventor: Adrian Steiner, Weggis (CH)

(73) Assignee: STEINER AG WEGGIS, Weggis (CH)

( * ) Notice: Subject to any disclaimer, the term of this patent is extended or adjusted under 35 U.S.C. 154(b) by 1049 days.

(21) Appl. No.: 16/463,442

(22) PCT Filed: Nov. 3, 2017

(86) PCT No.: PCT/EP2017/078145
§ 371 (c)(1),
(2) Date: May 23, 2019

(87) PCT Pub. No.: WO2018/103972
PCT Pub. Date: Jun. 14, 2018

(65) Prior Publication Data
US 2019/0350403 A1 Nov. 21, 2019

(30) Foreign Application Priority Data
Dec. 7, 2016 (EP) ..................................... 16202735

(51) Int. Cl.
*A47J 31/44* (2006.01)
(52) U.S. Cl.
CPC ................................ *A47J 31/4485* (2013.01)
(58) Field of Classification Search
CPC ................ A47J 31/3671; A47J 31/5253; A47J 31/3609; A47J 31/525; A47J 31/42;
(Continued)

(56) References Cited

U.S. PATENT DOCUMENTS

| 7,178,453 B2 | 2/2007 | In Albon |
| 7,527,818 B2 | 5/2009 | Dirren |

(Continued)

FOREIGN PATENT DOCUMENTS

| CN | 101277635 A | 10/2008 |
| CN | 201223297 Y | 4/2009 |

(Continued)

OTHER PUBLICATIONS

Abstract of DE102006043905.
(Continued)

*Primary Examiner* — Phuong T Nguyen
(74) *Attorney, Agent, or Firm* — Brian Roffe

(57) ABSTRACT

Device for heating milk or milk froth with steam in a steam/liquid mixer which is equipped with a tubular mixing chamber, at least one steam supply pipe and a milk/milk froth supply nozzle aligned in the longitudinal direction of the mixing chamber. The steam supply pipe operatively discharges steam into a steam supply chamber upstream of the mixing chamber and which is connected to the mixing chamber by steam inlet holes running around the milk/milk froth supply nozzle in the longitudinal direction of the mixing chamber. The steam supply holes are preferably aligned axially parallel to the center axis of the mixing chamber. This arrangement of the steam inlet holes brings about even and thorough mixing of the steam with the cold milk or the milk froth in the mixing chamber, and so optimal heating of the milk or the milk froth.

19 Claims, 3 Drawing Sheets

(58) Field of Classification Search
CPC .......... A47J 31/52; A47J 31/404; A47J 31/36;
A47J 31/5255; A47J 31/34; A47J 31/545;
A47J 31/24; A47J 31/30; A47J 31/5251;
A47J 31/468; A47J 31/56; A23F 5/26
USPC ......... 99/300, 293, 295, 279, 280, 281, 282,
99/284, 291, 323.1, 453, 283
See application file for complete search history.

(56) References Cited

U.S. PATENT DOCUMENTS

| | | |
|---|---|---|
| 8,113,107 B2 | 2/2012 | Fraij et al. |
| 8,337,925 B2 | 12/2012 | Carbonini et al. |
| 8,357,416 B2 | 1/2013 | Schindler et al. |
| 8,925,441 B2 | 1/2015 | Steiner |
| 2008/0250937 A1 | 10/2008 | Fraij et al. |
| 2011/0039000 A1 | 2/2011 | Carbonini et al. |
| 2012/0174794 A1 | 7/2012 | Frij et al. |
| 2014/0299001 A1* | 10/2014 | Rimpl ................. A47J 31/4489 99/323.1 |
| 2015/0327715 A1 | 11/2015 | Steiner |
| 2017/0164644 A1 | 6/2017 | Steiner |
| 2018/0098659 A1 | 4/2018 | Steiner |
| 2019/0008313 A1 | 1/2019 | Steiner |
| 2019/0008314 A1 | 1/2019 | Steiner |

FOREIGN PATENT DOCUMENTS

| | | |
|---|---|---|
| CN | 102036590 A | 4/2011 |
| DE | 3838235 A1 | 6/1989 |
| DE | 102006043905 A1 | 4/2008 |
| EP | 2798989 A1 | 11/2014 |
| WO | 2015154211 A1 | 10/2015 |
| WO | 2018103972 A1 | 6/2018 |

OTHER PUBLICATIONS

Abstract of EP 2798989.
Abstract of DE3838235.
Abstract of CN 201223297.

* cited by examiner

DEVICE FOR HEATING MILK OR MILK FOAM

FIELD OF THE INVENTION

The invention relates to a device for heating milk or milk froth with steam in a steam/liquid mixer which is provided with a tubular mixing chamber, at least one steam supply pipe and a milk/milk foam supply nozzle aligned in the longitudinal direction of the mixing chamber. The invention also relates to a particularly suitable steam/liquid mixer for this type of device.

BACKGROUND OF THE INVENTION

Devices of this type are used in particular in automatically working coffee machines for the preparation of drinks containing milk or milk froth. It is well known that the milk or the milk froth is heated here by mixing it with the steam that is supplied to it. The properties of the heated milk or of the heated milk froth are of considerable importance for the quality of the drink that is produced.

A device of the type specified at the start is disclosed in DE-OS 38 38 235. The device shown here is characterized in that both its apparatus and its construction have a relative simple structure. However, it has the disadvantage that the supply of steam into the mixing chamber of the mixer takes place transversely to the longitudinal direction of the mixing chamber and only bundled in one or in a maximum of two directions transverse to one another. Consequently, the mixing of the steam with the jet of milk flowing along the mixing chamber is spatially uneven and also fluidically inadequate.

OBJECTS AND SUMMARY OF THE INVENTION

The object underlying the invention is to avoid these disadvantages and to devise a device of the type specified at the start which, with a simple structure, guarantees even heating of the milk or the milk froth.

According to the invention, this object is achieved by the steam supply pipe discharging into a steam supply chamber upstream of the tubular mixing chamber, which steam supply chamber is connected to the mixing chamber by steam inlet holes running around the milk supply nozzle in the longitudinal direction of the mixing chamber.

In this way, the steam is introduced evenly into the milk or the milk froth in the direction of the jet of milk flowing through the mixing chamber so that both media can also mix evenly and thoroughly with one another along the entire mixing chamber. The mixing takes place here without any turbulence and in a fluidically optimal manner.

It is advantageous from the production point of view if the steam inlet holes according to the invention run parallel to the center axis of the tubular mixing chamber. In accordance with the invention, they may, however, also be inclined slightly at an angle to the center axis of the mixing chamber.

It is also advantageous in accordance with the invention if the mixer preferably has four steam inlet holes distributed evenly around the milk supply nozzle.

For reasons relating to safety, the steam inlet holes may be provided with check valves.

In order to optimize the mixing effect in the mixing chamber, the invention also makes provision such that the steam/liquid mixer is provided with a respective throttle before and after the mixer, the throttle before the mixer having a smaller degree of throttling than the throttle after the mixer.

The steam/liquid mixer according to the invention is characterized in a first version in that it is made in one piece, the steam supply chamber preferably being divided into a number of radial individual chambers which are each connected to the tubular mixing chamber by its own steam inlet hole. This type of design is advantageous from the point of view of production and assembly.

In a second version, the steam/liquid mixer is made in two parts, the front part receiving the milk/milk foam supply nozzle, while the rear part contains the steam supply chamber and the mixing chamber connected to the latter by the steam inlet holes. This version is, on its part, advantageous if the supply of steam to the mixer is also to perform a cleaning function. By means of the two-part design, the components of the mixer are then more accessible during the cleaning process.

For constructional reasons, it is advantageous if the steam supply chamber is formed by an annular space between the front part and the rear part.

For better distribution of the steam, the invention also makes provision such that the steam flows into the space through at least one tangentially aligned steam inlet channel by means of which a flow of steam rotating around the milk/milk froth supply nozzle is generated.

BRIEF DESCRIPTION OF THE DRAWINGS

The invention is described in more detail below by means of two exemplary embodiments with reference to the drawings. These show as follows.

DETAILED DESCRIPTION OF THE INVENTION

Figure 1:
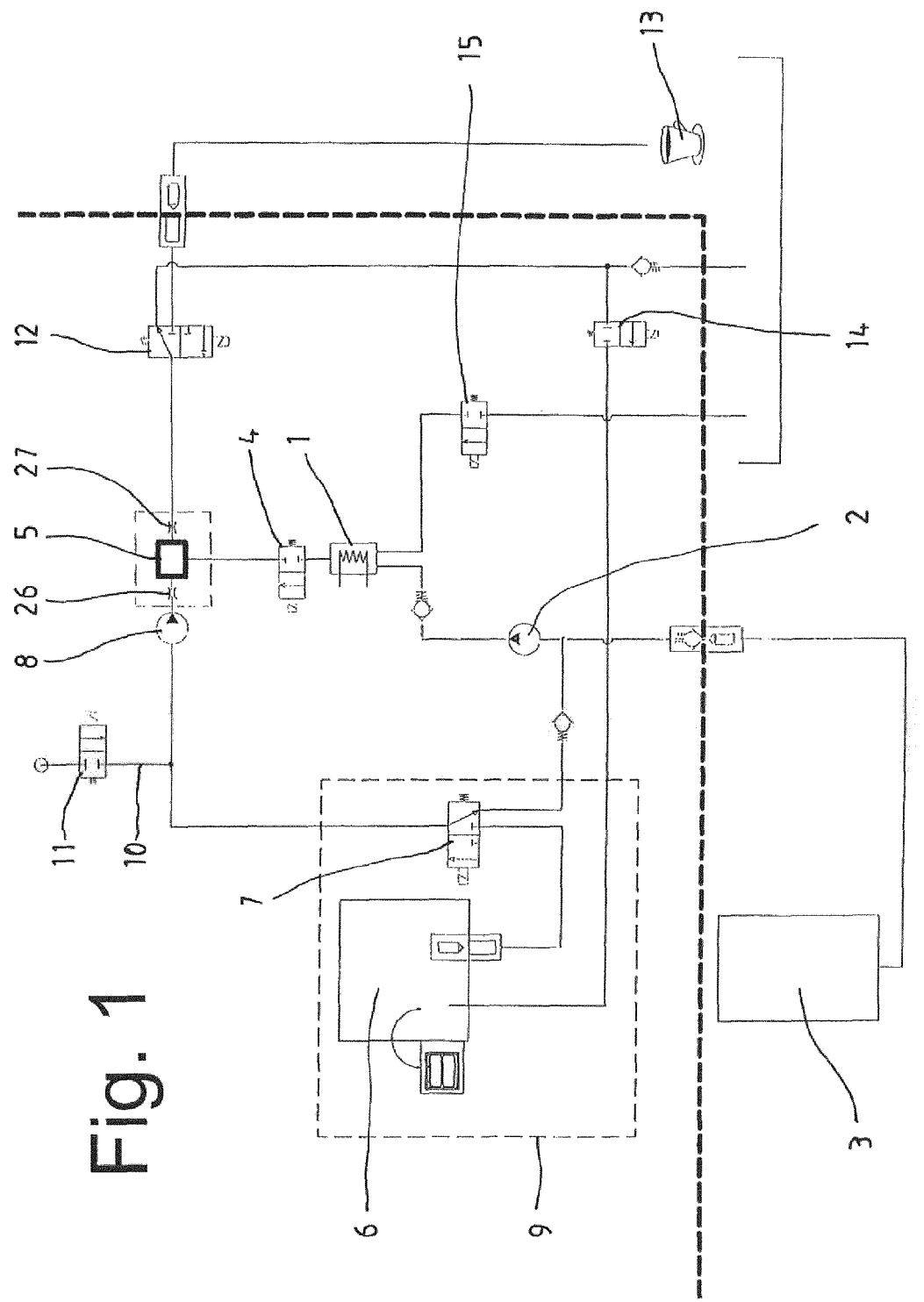
FIG. 1 is a hydraulic diagram of a device according to the invention.

The device according to FIG. 1 serves to heat milk or milk froth with steam. It has a steam boiler 1 which is fed from a water container 3 by a water pump 2 and can be connected by a steam control valve 4 to a steam/liquid mixer 5 in which hot steam at a temperature of approximately 130° to 140° is mixed with cold milk or milk froth.

The device also comprises a milk container 6 for cold milk for the preparation of the drinks containing milk or milk froth. The milk container 6 can be connected to the steam/liquid mixer 5 by a milk control valve 7 and a milk pump 8. The milk container 6 and the milk control valve 7 are accommodated within a cooling chamber 9 of the device. In order to prepare milk froth, an air supply pipe 10 with an air control valve 11 is provided upstream of the milk pump 8. The milk or milk foam heated in the steam/liquid mixer 5 can be removed by means of an outlet valve 12 in a drinking vessel 13 or the like.

The device that is described further comprises a cleaning valve 14 and a drain valve 15 as components of a conventional cleaning circuit for the elements of the device which are active during operation. This type of cleaning system is known in its own right and does not concern the subject matter of the present invention.

The components of the device defined by bold dashed lines in FIG. 1 together form an independent module which, as such, can be incorporated into a coffee machine.

Figure 2:
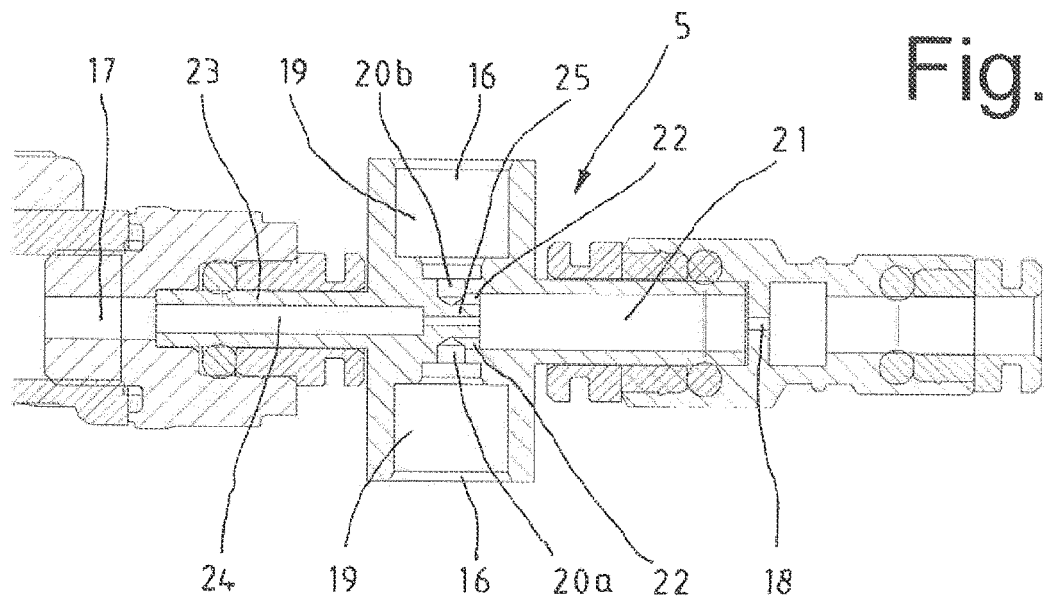
FIG. 2 shows a first version of the steam/liquid mixer of the device according to FIG. 1 in section and shown diagrammatically.

A first embodiment of the steam/liquid mixer 5 from FIG. 1 is illustrated in FIG. 2. This mixer is provided with steam supply pipes 16, a cold milk/cold milk froth inlet 17 and a hot milk/hot milk froth outlet 18 out of which the heated milk or the heated milk froth flows.

The steam/liquid mixer 5 according to FIG. 2 is characterized in that it is made in one piece, the steam being supplied by means of the two radial steam supply pipes 16 which can be connected into correspondingly radially aligned holes 19 of the mixer 5. These are continued in individual steam supply chambers 20a, 20b which on their part are connected to the tubular mixing chamber 21 of the mixer by means of steam inlet holes 22 running axially parallel to the center axis of the mixing chamber.

The supply of cold milk or cold milk froth into the mixing chamber 21 takes place on its part by means of a pipe connection 23 with an axially directed channel 24 which is connected on the one hand to the cold milk/cold milk froth inlet 17, and on the other hand to a milk/milk froth supply nozzle 25 discharging into the mixing chamber 21 and which produces a jet of milk/milk froth in the axial direction of the mixing chamber 21.

As can be seen from FIG. 2, the steam inlet holes 22 are distributed evenly around the milk/milk froth supply nozzle 25 and run in the longitudinal direction of the mixing chamber 21. In the present exemplary embodiment, they are arranged axially parallel to the mixing chamber 21. For fluidic reasons they may, however, also be slightly inclined at an angle to the center axis of the mixing chamber 21. The mixer 5 is provided with two steam inlet holes. The number of the latter may, however, vary depending on the dimensions of the mixing chamber.

As can be seen from FIG. 1, throttles 26, 27 are provided before and after the mixer, the throttles 26 before the mixer having a smaller throttling effect than the throttle 27. This type of arrangement is advantageous for the thorough mixing of the steam with the cold milk or the cold milk froth in the mixing chamber 21.

Figure 3:
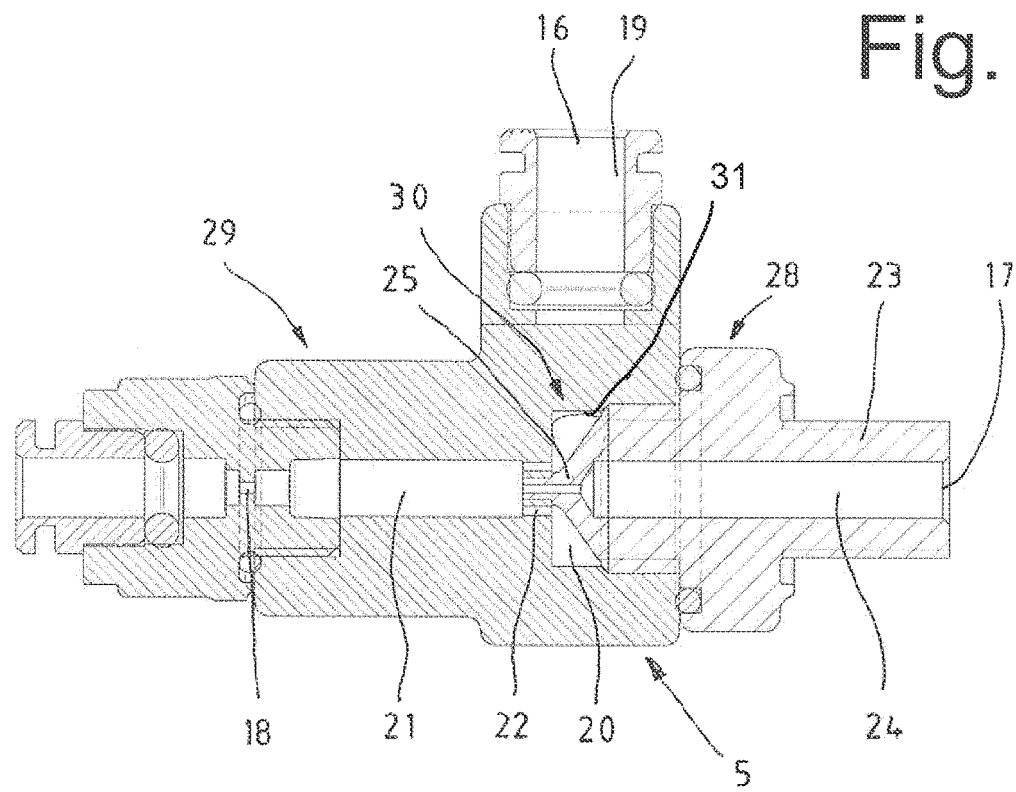
FIG. 3 shows a second version of the steam/liquid mixer of the device according to FIG. 1, likewise in section and shown diagrammatically.
Figure 4:
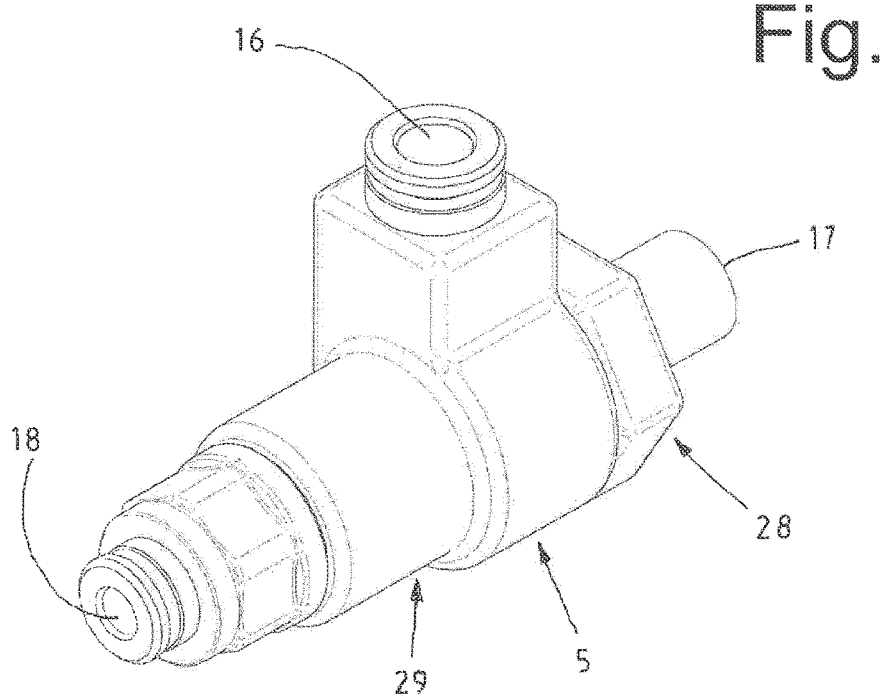
FIG. 4 is a perspective view of the steam/liquid mixer according to FIG. 3.
Figure 5:
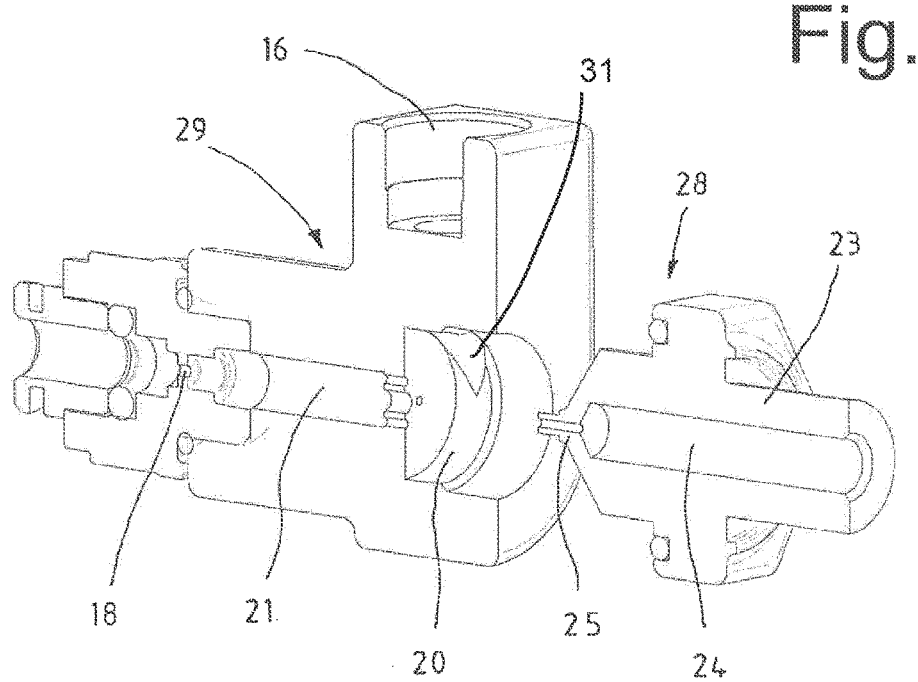
FIG. 5 is a detail of the steam/liquid mixer according to FIG. 3 as a perspective section in which the rear part is shown explosively.

The steam/liquid mixer according to FIGS. 3-5 essentially differs from the mixer according to FIG. 2 in that it is made in two parts, the front part 28 receiving the cold milk/cold milk froth supply nozzle 25, while the rear part 29 contains the steam supply chamber 20 and the mixing chamber 21 connected to the latter by means of the steam inlet holes 22. The mixer is equipped with just one steam supply pipe 16 and just one steam supply chamber 20 connected to it. The latter is created by an annular space 30 between the front part 28 and the rear part 29 which totally surrounds the cold milk/cold milk froth supply nozzle 25.

Unlike in the version according to FIG. 2, the steam is supplied here to the steam supply chamber 20 by means of at least one tangentially aligned steam inlet channel 31 by means of which a flow of steam rotating around the cold milk/cold milk froth supply nozzle 25 is generated. In this way, optimal steam distribution can be achieved in the steam supply chamber 20.

Four steam inlet holes 22 are provided, three of which are visible in FIG. 5. According to the invention, they are also arranged in the longitudinal direction of the milk channel 24 and are aligned axially parallel to the mixing chamber 21. However, they may also be slightly inclined at an angle to the center axis of the mixing chamber. The number of holes may also vary here according to the dimensions of the mixer.

The alignment according to the invention of these holes in the longitudinal direction of the mixing chamber 21 makes it possible for the cold milk or the cold milk froth to mix thoroughly with the steam in the mixing chamber and evenly over the entire length of the mixing chamber. In this way, the milk heating process takes place optimally, and the milk or milk froth which is heated in this way thus obtains the properties which are desired for the preparation of qualitatively demanding drinks.

The device according to the invention is also suitable as an autonomous device for heating milk or for producing milk froth and other comparable liquids.

The steam inlet holes could have a semi-circular instead of a circular cross-section or be made in some other shape in order to enable a fluidically optimal inflow of steam.

Preferably, a temperature sensor (not detailed) could also be incorporated after the hot milk/hot milk froth outlet 18, by means of which sensor it would be possible to control the temperature of the milk or of the milk froth here, advantageously by varying the pump speed of the water pump 2 and so the amount of steam per unit of time so that milk/milk froth with the desired or set target temperature were always released at the outlet into the drinking vessel 13.

The invention claimed is:

1. A device for heating milk or milk froth with steam, comprising:
    a milk container;
    a steam/liquid mixer defining a mixing chamber and including a pipe connection, at least one steam supply pipe, and a milk/milk froth supply nozzle aligned in a longitudinal direction of said mixing chamber and in flow communication with said mixing chamber, said pipe connection defining an axially directed channel having a milk/milk froth inlet and being in flow communication with said milk/milk froth supply nozzle;
    a milk pump that pumps milk from said milk container through said milk/milk froth inlet into said channel and through said channel to said milk/milk froth supply nozzle;
    a milk control valve that controls flow of milk from said milk container to said milk/milk froth supply nozzle;
    an air supply pipe through which air is supplied to a conduit through which the milk flows between said milk container and said mixer whereby milk froth is prepared when air is supplied to said conduit and milk flows through said conduit; and
    an air control valve that controls flow of air through said air supply pipe;
    said mixer further defining at least one steam supply chamber upstream of said mixing chamber in a flow direction and which is connected to said mixing chamber by steam inlet holes radially outward of said milk/milk froth supply nozzle, said steam inlet holes extending in the longitudinal direction of said mixing chamber, said at least one steam supply pipe being in flow communication with a respective one of said at least one steam supply chamber.

2. The device according to claim 1, wherein said mixing chamber is tubular and said steam inlet holes are parallel to a center axis of said tubular mixing chamber.

3. The device according to claim 1, further comprising a respective throttle before and after said mixer, a degree of throttling of said throttle before said mixer being smaller than a degree of throttling of said throttle after said mixer.

4. The device according to claim 1, wherein said mixer is made in one piece, said at least one steam supply chamber being divided into a number of radial individual chambers which are each connected to said mixing chamber by a respective one of said steam inlet holes.

5. The device according to claim 1, wherein said at least one steam supply chamber consists of a single steam supply chamber, said mixer comprises a front part defining said milk/milk froth supply nozzle and a rear part containing said single steam supply chamber and said mixing chamber, and said mixing chamber is connected to said single steam supply chamber by said steam inlet holes.

6. The device according to claim 5, wherein said single steam supply chamber is an annular space between said front part and said rear part.

7. The device according to claim 6, said front part includes said pipe connection such that said channel is situated in said front part, said steam holes are formed entirely in said rear part, said at least one steam supply pipe consisting of a single steam supply pipe, said single steam supply chamber being in flow communication with said single steam supply pipe.

8. The device according to claim 6, wherein said at least one steam supply pipe consists of a single steam supply pipe and said mixer further defines at least one tangentially aligned steam inlet channel between said single steam supply pipe and said annular space and which is situated relative to said milk/milk froth supply nozzle to operatively cause a flow of steam rotating in said annular space around said milk/milk froth supply nozzle.

9. The device according to claim 6, wherein said annular space is defined by said milk/milk froth supply nozzle on a radially inward side and by said rear part on a radially outward side.

10. The device according to claim 6, wherein said annular space is defined by said front part on a radially inward side and by said rear part on a radially outward side.

11. The device according to claim 6, wherein said annular space surrounds said milk/milk froth supply nozzle.

12. The device according to claim 5, wherein said front part includes said pipe connection such that said channel is situated in said front part.

13. The device according to claim 5, wherein said steam holes are formed entirely in said rear part.

14. The device according to claim 5, wherein said at least one steam supply pipe consists of a single steam supply pipe, said single steam supply chamber being in flow communication with said single steam supply pipe.

15. The device according to claim 5, wherein said at least one steam supply pipe consists of a single steam supply pipe, said rear part defining at least one tangentially aligned steam inlet channel between said single steam supply pipe and said single steam supply chamber and which is situated relative to said milk/milk froth supply nozzle to operatively cause a flow of steam rotating around said milk/milk froth supply nozzle.

16. The device according to claim 1, wherein said mixer further defines at least one tangentially aligned steam inlet channel between said at least one steam supply pipe and said at least one steam supply chamber and which is situated relative to said milk/milk froth supply nozzle to operatively cause a flow of steam rotating around said milk/milk froth supply nozzle.

17. The device according to claim 1, wherein said air control valve is upstream of said milk pump in a flow direction of milk.

18. The device according to claim 1, wherein said milk/milk froth supply nozzle is configured to produce a jet of milk/milk froth in the longitudinal direction of said mixing chamber.

19. The device according to claim 1, wherein said at least one steam supply chamber consists of a single steam supply chamber and said at least one steam supply pipe consists of a single steam supply pipe, said mixer further defining a tangentially aligned steam inlet channel between said single steam supply pipe and said single steam supply chamber and which is situated relative to said milk/milk froth supply nozzle to operatively cause a flow of steam rotating around said milk/milk froth supply nozzle.

* * * * *